O. A. AMBLE.
THRESHING MACHINE.
APPLICATION FILED JULY 31, 1909.
938,624.
Patented Nov. 2, 1909.
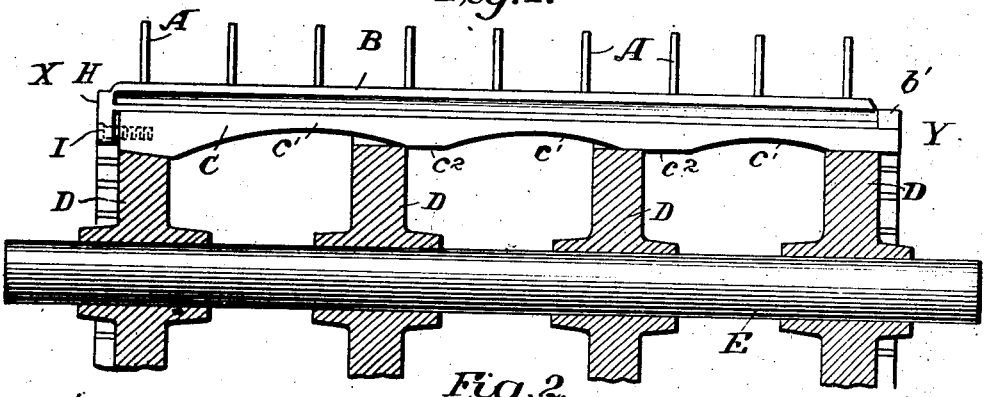
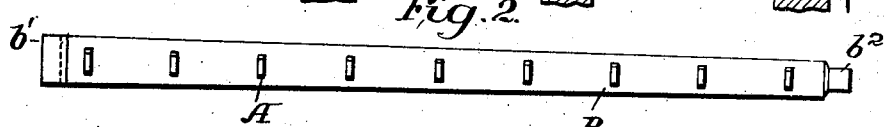
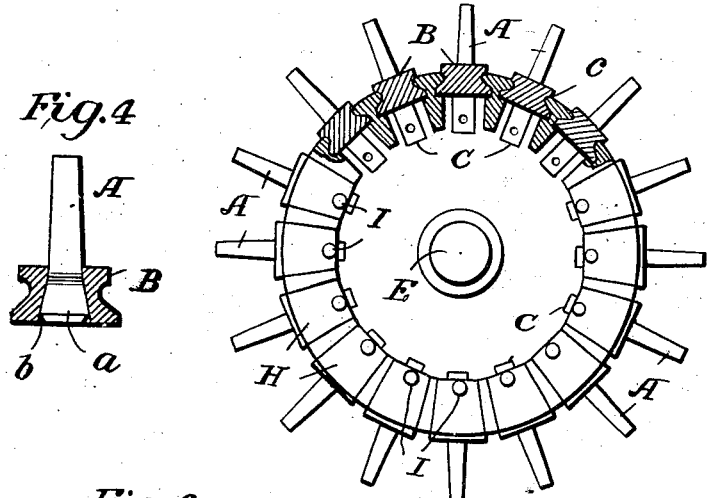
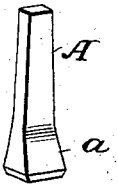
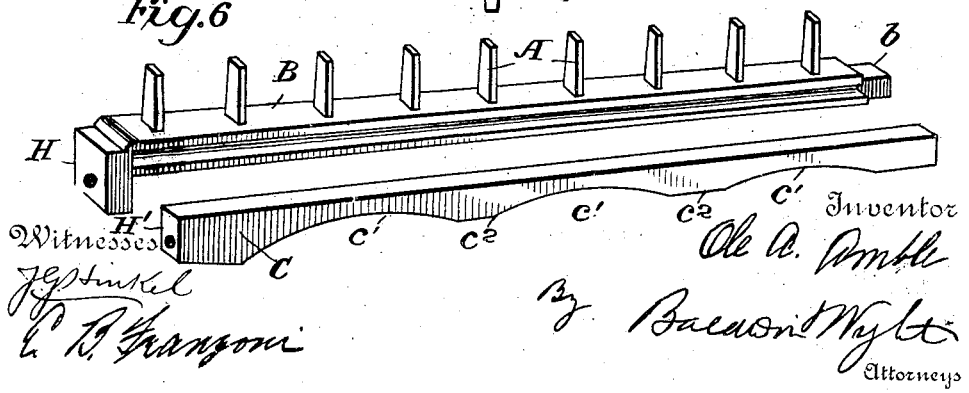

UNITED STATES PATENT OFFICE.

OLE A. AMBLE, OF GRAND FORKS, NORTH DAKOTA.

THRESHING-MACHINE.

938,624.  Specification of Letters Patent.  Patented Nov. 2, 1909.

Application filed July 31, 1909. Serial No. 510,543.

*To all whom it may concern:*

Be it known that I, OLE A. AMBLE, a citizen of the United States, residing in Grand Forks, in the county of Grand Forks and State of North Dakota, have invented certain new and useful Improvements in Threshing-Machines, of which the following is a specification.

The object of my invention is to provide improved means for attaching teeth to the cylinders of threshing machines, but my improvements may also be employed for attaching teeth to the concaves of threshing machines, and for attaching teeth to other supports.

According to my invention the teeth are made wedge-shaped or tapered or have wedge-shaped or tapered portions which enter corresponding holes in the tooth-supporting bars, and these bars are also tapered and adapted to fit in grooves or recesses formed in the cylinder frame or in the parts which support the tooth-bearing bars.

In order to lock the bars in place, I employ what I call locking bars; these are adapted to enter recesses below the recesses which receive the tooth-supporting bars and are adapted to have an endwise movement therein. The inner or under face of each locking bar is formed with a series of wedges or inclines which are adapted to move on the bottom portions of the recesses in which the locking bar slides, the arrangement being such that in one position the locking bar firmly engages the tooth-supporting bar and holds it rigidly in place, and at the same time also holds the teeth securely in position, but in another position of the locking bar, the engagement between said bar and the tooth-supporting bar is loosened so that the tooth-supporting bar may be readily removed from the cylinder.

In the accompanying drawings, Figure 1 is a view partly in section and partly in elevation illustrating how my improvements may be applied to the cylinder of a threshing machine. Fig. 2 is a plan view of the upper or outer face of the tooth-supporting bar, with teeth mounted therein. Fig. 3 is a view partly in end elevation and partly in section of a threshing machine cylinder with my improvements applied. Fig. 4 is a detail view on an enlarged scale, illustrating how the teeth are held in the tooth-supporting bar, and also showing the cross-sectional shape of this bar. Fig. 5 is a perspective view of one of the teeth. Fig. 6 is a perspective view, showing the teeth-supporting bar, the teeth carried therein, and the locking bar which coöperates therewith.

The teeth A are preferably tapered, as shown, or have wedge-shaped portions $a$ which enter corresponding sockets $b$ in the tooth-supporting bars B. I have illustrated a threshing machine cylinder in which sixteen tooth-supporting bars are employed, but this may, of course, be varied. The bars are all of the same construction and are connected with the frame of the cylinder in the same way. Each bar B, as illustrated in Fig. 2, is tapered from one end $b'$ to its opposite end $b^2$ and it is provided with a series of holes $b$ to receive a suitable number of teeth A. When the teeth are arranged in the holes their outward movement is limited and they fit closely so as not to be able to wabble or move sidewise while they are prevented from moving inward by the locking bar hereinafter more fully described.

The frame of the cylinder is shown as consisting of a series of disks D, mounted on the shaft E. These disks are provided on their peripheries with a suitable number of recesses $c$ to receive the tooth-supporting bars B, and they are also provided with corresponding recesses to receive the locking bars C.

As shown in Fig. 4, each tooth-supporting bar is dove-tailed to fit a corresponding formation in the disks D, so that the bars may slide endwise across the peripheries of the disks but are prevented from moving in any other direction. The recesses to receive the bars B gradually taper from the end X of the cylinder to the end Y, so that when the locking bars are moved across the cylinder to their full extent they will be tightly held in place. In order, however, to more securely lock the bars in position, the locking bars C are employed, there being one such locking bar for each tooth-supporting bar. The locking bars enter recesses between the inner ends of the recesses $c$ which receive the bars B and the axis of the cylinder. Each locking bar, as shown in Figs. 1 and 6, is provided with concaved portions $c'$ and raised portions $c^2$. When the concaved portions are in line with the disks the locking bars loosely engage the tooth-supporting bars but when the raised portions $c^2$ engage the disks the locking bars are firmly held against the under or inner sides of the tooth-supporting bars so that a rigid connection is made between the tooth-supporting bars and the disks. Each tooth-supporting bar is preferably formed with a flange H which, when the parts are assembled, extends across the end H' of its companion locking bar and a bolt I is employed to secure the locking bar to the tooth-supporting bar. When thus assembled and secured, as shown in Fig. 1, the parts are all firmly connected and there is no danger of their separation in the ordinary operation of the machine.

In order to detach a tooth-supporting bar from the machine it is only necessary to remove the bolt I and then slide the locking bar to the right, as shown in Fig. 1. This will loosen the connection and the tooth-supporting bar may be detached without disturbing any of the other bars. Any tooth in this bar may be easily removed and replaced if necessary. In this way I am able to provide threshing machine teeth of very simple formation and not involving the use of screw threads or nuts for securing them in place, and there is absolutely no danger of the teeth becoming loosened.

I claim as my invention:—

1. The combination of a support provided with undercut recesses, a tooth-supporting bar arranged to slide endwise in said recesses, and a locking bar operating in the inner portions of said recesses beneath the tooth-supporting bar and having wedges operating on the inner walls of the recesses to force said tooth-supporting bar outward.

2. The combination of a support provided with undercut recesses, a tooth-supporting bar arranged to slide endwise in said recesses and having tapered openings to receive the teeth, teeth having tapered bases arranged in the recesses of the tooth-supporting bar, and an endwise moving locking bar operating beneath the tooth-supporting bar and having wedges operating on the inner walls of the recesses to cause the locking bar to press the teeth outward in the tooth-supporting bar.

3. In a threshing machine cylinder the combination of the supporting disks having undercut recesses in their peripheries, tooth-supporting bars arranged to slide endwise in said recesses, and endwise moving locking bars arranged in the recesses between the axis of the disks and the peripheries thereof and each having wedges operating on the inner walls of said recesses to force the tooth-supporting bar and the teeth carried thereby outward.

4. In a threshing machine cylinder, the combination of the supporting disks having undercut recesses in their peripheries, endwise moving tooth-supporting bars arranged in said recesses and having tapered openings for the teeth, teeth having tapered inner ends arranged in said recesses of the tooth-supporting bars, and endwise moving locking bars arranged in the recesses between the axis of the disks and the peripheries thereof and each having wedges operating on the inner walls of said recesses to force the teeth radially outward.

5. In a threshing machine cylinder, the combination of the supporting disks, the tapered tooth-supporting bars having dovetailed sliding connection with the disks, endwise moving locking bars engaging the under sides of the tooth-supporting bars and having wedges engaging the disks, and means for connecting the end of each tooth-supporting bar with its locking bar.

6. The combination of the tooth-supporting bars, having outwardly tapered holes, the teeth having tapered portions engaging the holes in the tooth-supporting bars, the endwise moving locking bars engaging the under sides of the tooth-supporting bars and holding the teeth in place, and provided with wedges on their inner or under sides, and supports in which the tooth-supporting bars operate.

In testimony whereof, I have hereunto subscribed my name.

OLE A. AMBLE.

Witnesses:
CHAS. C. McMULLEN,
V. JARVIS.